United States Patent
Lee

(10) Patent No.: US 12,431,520 B2
(45) Date of Patent: Sep. 30, 2025

(54) FUEL CELL DEVICE

(71) Applicants: Hyundai Motor Company, Seoul (KR); Kia Corporation, Seoul (KR)

(72) Inventor: Woo Young Lee, Yongin-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 577 days.

(21) Appl. No.: 17/968,468

(22) Filed: Oct. 18, 2022

(65) Prior Publication Data

US 2023/0197990 A1    Jun. 22, 2023

(30) Foreign Application Priority Data

Dec. 16, 2021    (KR) .................. 10-2021-0180951

(51) Int. Cl.
    *H01M 8/04858* (2016.01)
    *H01M 8/04537* (2016.01)
    *H02J 7/00* (2006.01)

(52) U.S. Cl.
    CPC ..... *H01M 8/0494* (2013.01); *H01M 8/04559* (2013.01); *H02J 7/0063* (2013.01); *H02J 2207/20* (2020.01); *H02J 2300/30* (2020.01)

(58) Field of Classification Search
    CPC .......... H01M 8/0494; H01M 8/04559; H01M 8/0488; H01M 8/04947; H01M 16/006; H02J 7/0063; H02J 7/34
    See application file for complete search history.

(56) References Cited

FOREIGN PATENT DOCUMENTS

KR    20130019730 A    2/2013

*Primary Examiner* — Sarah A. Slifka
(74) *Attorney, Agent, or Firm* — Slater Matsil, LLP

(57) ABSTRACT

An embodiment fuel cell device includes a fuel cell, a power controller configured to convert a magnitude of a stack voltage output from the fuel cell and to output the stack voltage having the converted magnitude to a load, and a junction box including a bypass diode that includes an anode coupled to the stack voltage and to a voltage input terminal of the power controller and a cathode coupled to a voltage output terminal of the power controller and to the load, wherein the voltage output terminal of the power controller is configured to carry a voltage having the converted magnitude.

20 Claims, 5 Drawing Sheets

FUEL CELL DEVICE

CROSS-REFERENCE TO RELATED APPLICATIONS

This application claims the benefit of Korean Patent Application No. 10-2021-0180951, filed on Dec. 16, 2021, which application is hereby incorporated herein by reference.

TECHNICAL FIELD

Embodiments relate to a fuel cell device including a fuel cell.

BACKGROUND

A fuel cell is a kind of power generation device that converts chemical energy of fuel into electrical energy through an electrochemical reaction in a fuel cell stack, rather than converting the same into heat through combustion. Such a fuel cell may be applied not only to power supplies for industrial and household use and to propel vehicles, but also for the supply of power to small electric/electronic products, particularly, portable devices.

In a fuel cell device that uses a fuel cell as a power source, when the magnitude of voltage charged in a high-voltage battery is not greater than the magnitude of voltage generated in the fuel cell, a very large amount of bypass current flows through a boost converter of the fuel cell device, which leads to burning of internal elements of the boost converter, particularly, diodes, or damage to the high-voltage battery. Therefore, research with the goal of solving this problem is underway.

SUMMARY

Accordingly, embodiments are directed to a fuel cell device that substantially obviates one or more problems due to limitations and disadvantages of the related art.

Embodiments provide a fuel cell device, which incurs relatively low servicing costs.

However, the features that may be accomplished by the embodiments are not limited to the above-mentioned features, and other features not mentioned herein will be clearly understood by those skilled in the art from the following description.

A fuel cell device according to an embodiment may include a fuel cell, a power controller configured to convert the magnitude of a stack voltage output from the fuel cell and to output the stack voltage having the converted magnitude to a load, and a junction box including a bypass diode, which has an anode, connected to the stack voltage and to a voltage input terminal of the power controller, and a cathode, connected to a voltage output terminal of the power controller, which outputs a voltage having the converted magnitude, and to the load.

For example, the junction box may include a first positive terminal connected to a positive output terminal of the fuel cell and to a positive input terminal of the voltage input terminal, a first negative terminal connected to a negative output terminal of the fuel cell and to a negative input terminal of the voltage input terminal, a second positive terminal connected to a positive output terminal of the voltage output terminal and to the load, and a second negative terminal connected to a negative output terminal of the voltage output terminal and to the load.

For example, the anode of the bypass diode may be connected to the first positive terminal, and the cathode of the bypass diode may be connected to the second positive terminal.

For example, the junction box may include a first coupling part, coupled to the first positive terminal and to the anode of the bypass diode, and a second coupling part, coupled to the second positive terminal and to the cathode of the bypass diode.

For example, the bypass diode may be detachably connected to the first positive terminal and to the second positive terminal.

For example, the power controller may include an inductor having one end connected to the first positive terminal, a switching element having one end connected to an opposite end of the inductor and an opposite end connected to the second positive terminal, and a semiconductor switch having one end connected to the opposite end of the inductor and an opposite end connected to the first negative terminal and to the second negative terminal.

For example, the power controller may further include a first capacitor, disposed between the one end of the inductor and the opposite end of the semiconductor switch, and a second capacitor, disposed between the opposite end of the switching element and the opposite end of the semiconductor switch. Alternatively, the junction box may further include a first capacitor, disposed between the first positive terminal and the first negative terminal, and a second capacitor, disposed between the second positive terminal and the second negative terminal. The first capacitor and the second capacitor may be disposed to allow only the first capacitor and the second capacitor to be replaced from the junction box.

For example, the load may include a battery, connected to the second positive terminal and to the second negative terminal, and an inverter and a driving motor, connected to the second positive terminal and to the second negative terminal.

For example, the variation range of the stack voltage may at least partially overlap the variation range of a voltage charged in the battery.

For example, the bypass diode may be disposed to allow only the bypass diode to be replaced from the junction box.

For example, the stack voltage may be directly transmitted to the power controller.

For example, the fuel cell and the power controller may be directly connected to the junction box.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF ILLUSTRATIVE EMBODIMENTS

The present disclosure will now be described more fully hereinafter with reference to the accompanying drawings, in which various embodiments are shown. The examples, however, may be embodied in many different forms, and should not be construed as being limited to the embodiments set forth herein. Rather, these embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above", and "under/lower part/below", are used only to distinguish between one subject or element and another subject or element, without necessarily requiring or involving any physical or logical relationship or sequence between the subjects or elements.

Hereinafter, fuel cell devices 100A and 100B according to embodiments will be described with reference to the accompanying drawings. The fuel cell devices 100A and 100B will be described using the Cartesian coordinate system (x-axis, y-axis, z-axis) for convenience of description, but may also be described using other coordinate systems. In the Cartesian coordinate system, the x-axis, the y-axis, and the z-axis are perpendicular to each other, but the embodiments are not limited thereto. That is, the x-axis, the y-axis, and the z-axis may intersect each other obliquely.

Figure 1:
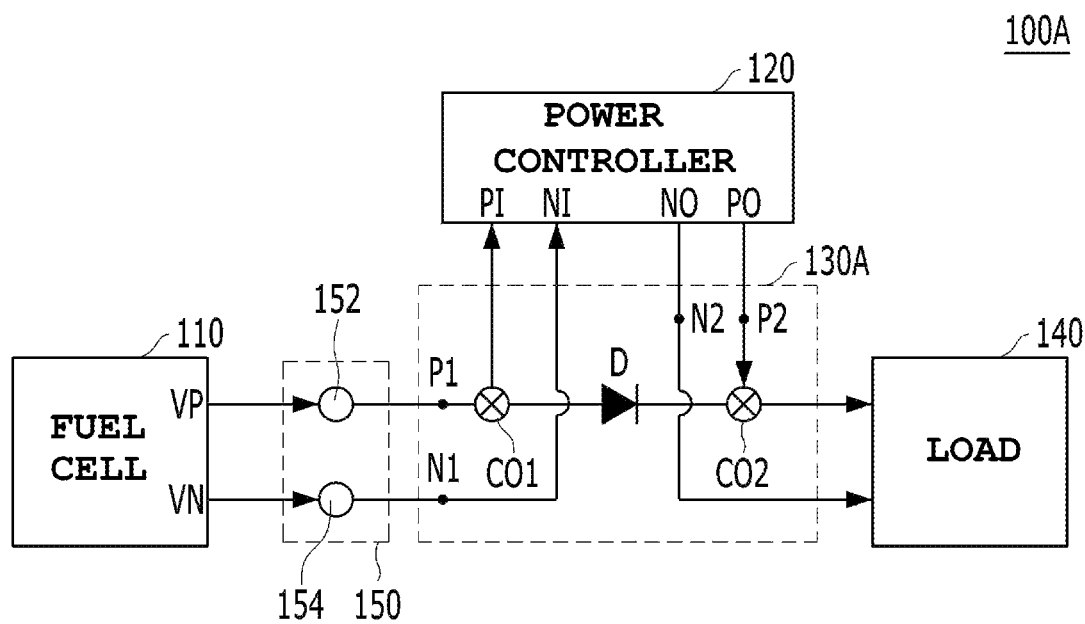
FIG. 1 is a block diagram of a fuel cell device according to an embodiment.

FIG. 1 is a block diagram of a fuel cell device 100A according to an embodiment.

The fuel cell device 100A shown in FIG. 1 may include a fuel cell 110, a power controller 120, a junction box (or a high-voltage junction box) 130A, and a load 140.

First, an example of the fuel cell 110, which may be included in the fuel cell device 100A, will be described in brief below. However, the embodiments are not limited to any specific form of fuel cell 110 included in the fuel cell device 100A.

The fuel cell 110 may be, for example, a polymer electrolyte membrane fuel cell (or a proton exchange membrane fuel cell) (PEMFC), which has been studied most extensively as a power source for driving vehicles. The fuel cell 110 may include a cell stack, and the cell stack may include a plurality of unit cells that are stacked. Each unit cell may generate 0.6 volts to 1.0 volt of electricity, on average 0.7 volts of electricity. The number of unit cells may be determined in accordance with the intensity of the power to be generated by the fuel cell 110.

The fuel cell 110 may include a positive output terminal VP and a negative output terminal VN. The voltage generated by and output from the fuel cell 110 (hereinafter referred to as "stack voltage") corresponds to the potential difference between the positive output terminal VP and the negative output terminal VN of the fuel cell 110.

The power controller 120 converts the magnitude of the stack voltage output from the fuel cell 110 and outputs the stack voltage having the converted magnitude (hereinafter referred to as "first voltage") to the load 140. For example, the power controller 120 may be a high-voltage boosting-type direct-current (DC)/direct-current (DC) converter (or a fuel-cell DC/DC converter (FDC)), which is a kind of boost converter that boosts the stack voltage generated in the fuel cell 110.

The power controller 120 may include voltage input terminals PI and NI and voltage output terminals PO and NO.

The voltage input terminals PI and NI are terminals to which the stack voltage is input. The voltage input terminals PI and NI may include a positive input terminal PI, which is connected to the positive output terminal VP of the fuel cell 110, and a negative input terminal NI, which is connected to the negative output terminal VN of the fuel cell 110.

The voltage output terminals PO and NO are terminals from which the first voltage is output. The voltage output terminals PO and NO may include a positive output terminal PO and a negative output terminal NO. The first voltage corresponds to the potential difference between the positive output terminal PO and the negative output terminal NO.

In addition, the fuel cell device 100A may further include a terminal block 150. The stack voltage output from the fuel cell 110 may be provided to the power controller 120 via the terminal block 150.

The terminal block 150 serves to electrically connect a current collector (not shown) of the fuel cell 110 to the junction box 130A. For example, the terminal block 150 may protrude from the upper surface of the fuel cell 110 toward the junction box 130A so as to be electrically connected to the junction box 130A.

The terminal block 150 may include a positive bus terminal portion 152 and a negative bus terminal portion 154. Although not shown, the terminal block 150 may further include a positive heater terminal portion and a negative heater terminal portion, which are connected to a heater (not shown) of the fuel cell 110. The positive bus terminal portion 152 and the negative bus terminal portion 154 serve to connect various bus bars and wires, included in the fuel cell 110, to the junction box 130A.

In some cases, the terminal block 150 may be included in the junction box 130A.

The junction box 130A may include various terminals and a bypass diode D, which are connected to the fuel cell 110 and the power controller 120. According to the embodiment, the junction box 130A does not include various switches, relay elements, or fuses, but serves merely to provide a space in which the fuel cell 110 and the power controller 120 are connected to each other. That is, terminals P1 and N1, which are connected to the positive output terminal VP and the negative output terminal VN of the fuel cell 110 and to the voltage input terminals PI and NI of the power controller 120, and terminals P2 and N2, which are connected to the voltage output terminals PO and NO of the power controller 120, are included in the junction box 130A.

The anode of the bypass diode D included in the junction box 130A is connected to the stack voltage and the voltage input terminal of the power controller 120, and the cathode of the bypass diode D is connected to the voltage output terminal of the power controller 120, from which the first voltage is output. Specifically, the anode of the bypass diode D may be connected to the positive input terminal PI, among the voltage input terminals PI and NI, and the cathode of the bypass diode D may be connected to the positive output terminal PO, among the voltage output terminals PO and NO.

According to the embodiment, the junction box 130A may include a first positive terminal P1, a first negative terminal N1, a second positive terminal P2, and a second negative terminal N2.

The first positive terminal P1 is connected not only to the positive output terminal VP of the fuel cell 110 via the positive bus terminal portion 152, but also to the positive input terminal PI, among the voltage input terminals PI and NI.

The first negative terminal N1 is connected not only to the negative output terminal VN of the fuel cell 110 via the negative bus terminal portion 154, but also to the negative input terminal NI, among the voltage input terminals PI and NI.

The second positive terminal P2 is connected to the positive output terminal PO, among the voltage output terminals PO and NO, and to the load 140.

The second negative terminal N2 is connected to the negative output terminal NO, among the voltage output terminals PO and NO, and to the load 140.

The first positive terminal P1 of the junction box 130A may be connected to the anode of the bypass diode D, and the second positive terminal P2 of the junction box 130A may be connected to the cathode of the bypass diode D.

In addition, the junction box 130A may further include first and second coupling parts CO1 and CO2. The first coupling part CO1 may be coupled to the first positive terminal P1 of the junction box 130A, the anode of the bypass diode D, and the positive input terminal PI, and the second coupling part CO2 may be coupled to the second positive terminal P2 of the junction box 130A, the cathode of the bypass diode D, and the load 140. The first and second coupling parts CO1 and CO2 serve to couple the bypass diode D to the junction box 130A. To this end, the first and second coupling parts CO1 and CO2 may be implemented as bolts, which are screwed into the junction box 130A.

Figure 2:
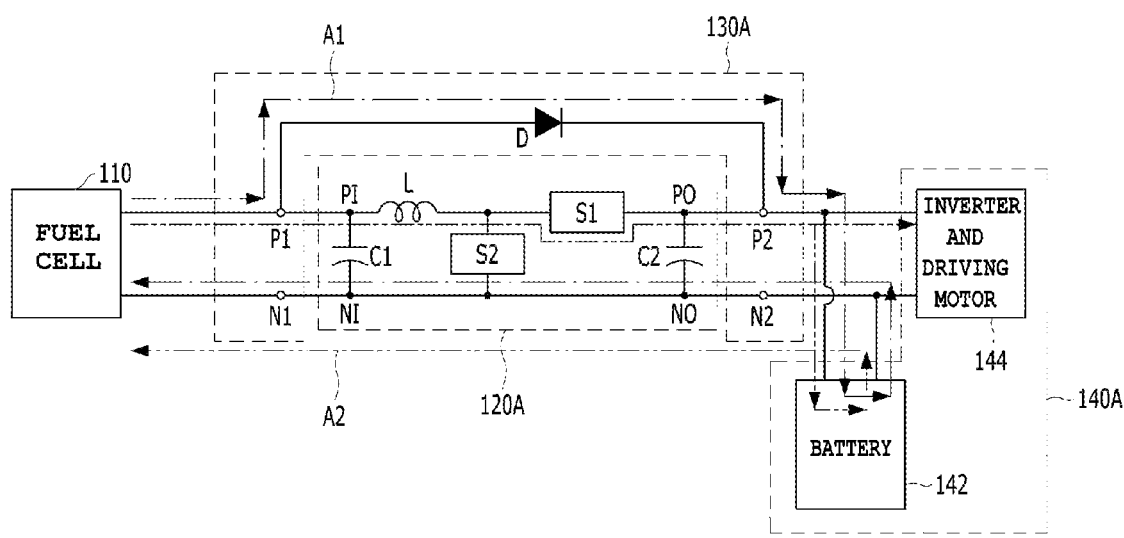
FIG. 2 shows an embodiment of the fuel cell device shown in FIG. 1.

FIG. 2 shows an embodiment of the fuel cell device 100A shown in FIG. 1.

The fuel cell device 100A shown in FIG. 2 may include a fuel cell 110, a power controller 120A, a junction box 130A, and a load 140A. The fuel cell 110, the power controller 120A, the junction box 130A, and the load 140A respectively correspond to the fuel cell 110, the power controller 120, the junction box 130A, and the load 140 shown in FIG. 1. In particular, the power controller 120A and the load 140A respectively correspond to embodiments of the power controller 120 and the load 140 shown in FIG. 1.

For convenience of explanation, a bypass diode D, a first positive terminal P1, a first negative terminal N1, a second positive terminal P2, and a second negative terminal N2 of the junction box 130A are illustrated in FIG. 2, but an illustration of the terminal block 150 shown in FIG. 1 is omitted from FIG. 2.

The boost converter, which is the power controller 120A, may include an inductor L, a switching element S1, and a semiconductor switch S2.

The inductor L has one end connected to the first positive terminal P1 via the positive input terminal PI and an opposite end connected to one end of the switching element S1.

The switching element S1 has one end connected to the opposite end of the inductor L and an opposite end connected to the second positive terminal P2 via the positive output terminal PO. The switching element S1 is a kind of power module. The switching element S1 may be implemented as a bipolar transistor or a field effect transistor, or may be implemented as a diode, but the embodiments are not limited thereto.

The semiconductor switch S2 has one end connected to the opposite end of the inductor L. The opposite end of the semiconductor switch S2 may be connected to the first negative terminal N1 via the negative input terminal NI, and may be connected to the second negative terminal N2 via the negative output terminal NO. The semiconductor switch S2 may be switched in response to a main operation control signal generated by a controller (not shown). For example, until the magnitude of voltage charged in the battery 142 of the load 140A (hereinafter referred to as "battery voltage") reaches the magnitude of the stack voltage, the semiconductor switch S2 included in the power controller 120A remains switched off. The semiconductor switch S2 may include, for example, an Insulated Gate Bipolar Transistor (IGBT), a Silicon-Controlled Rectifier (SCR), a Gate Turn-Off Thyristor (GTO), a Bipolar Junction Transistor (BJT), or a Metal Oxide Semiconductor Field Effect Transistor (MOS-FET).

According to an embodiment, the power controller 120A may further include first and second capacitors C1 and C2. The first capacitor C1 may be disposed between one end of the inductor L and the opposite end of the semiconductor switch S2, and the second capacitor C2 may be disposed between the opposite end of the switching element S1 and the opposite end of the semiconductor switch S2.

Figure 3:
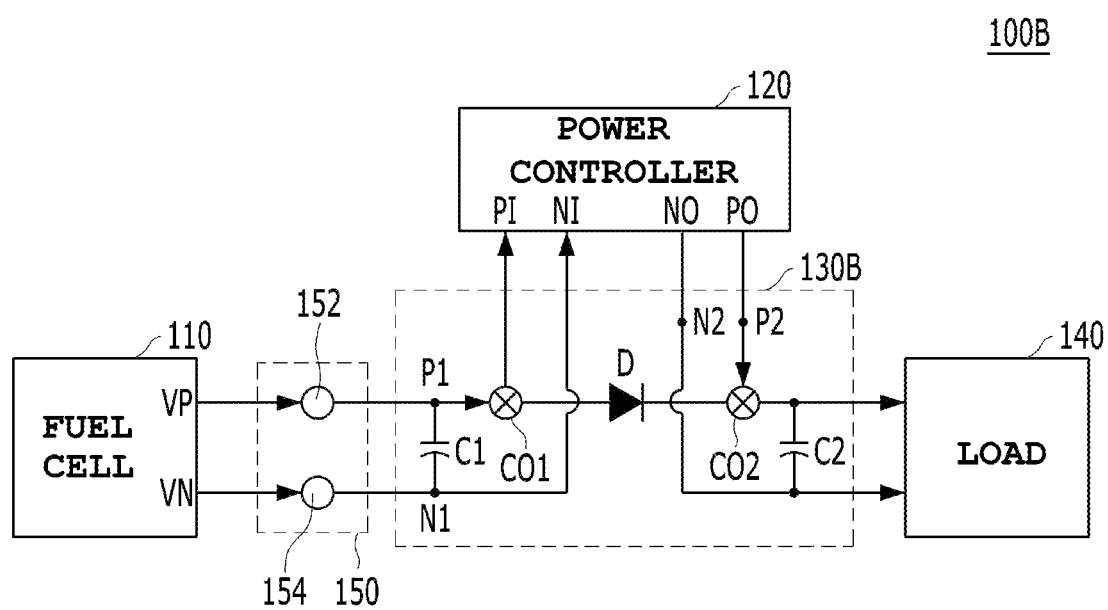
FIG. 3 is a block diagram of a fuel cell device according to another embodiment.

FIG. 3 is a block diagram of a fuel cell device 100B according to another embodiment.

The fuel cell device 100B shown in FIG. 3 may include a fuel cell 110, a power controller 120, a junction box 130B, a load 140, and a terminal block 150.

While the power controller 120A of the fuel cell device 100A shown in FIG. 2 includes the first and second capacitors C1 and C2, the fuel cell device 100B shown in FIG. 3 is constructed such that first and second capacitors C1 and C2 are included in the junction box 130B, rather than being included in the power controller 120 (120A). With this exception, the fuel cell device 100B shown in FIG. 3 is the same as the fuel cell device 100A shown in FIGS. 1 and 2, and thus a duplicate description thereof will be omitted. That is, the fuel cell 110, the power controller 120, the load 140, and the terminal block 150 shown in FIG. 3 respectively correspond to the fuel cell 110, the power controller 120, the load 140, and the terminal block 150 shown in FIG. 1. Therefore, the same parts are denoted by the same reference numerals, and duplicate descriptions thereof will be omitted.

Unlike the junction box 130A shown in FIG. 1, the junction box 130B shown in FIG. 3 may further include first and second capacitors C1 and C2. The first capacitor C1 may be disposed between the first positive terminal P1 and the first negative terminal N1, and the second capacitor C2 may be disposed between the second positive terminal P2 and the second negative terminal N2.

The loads 140 shown in FIGS. 1 and 3 may have various configurations depending on whether the fuel cell devices 100A and 100B are used for vehicles or used in fields other than vehicles, for example, in aircraft or ships or for power generation or charging. The fuel cell devices 100A and 100B according to the embodiments are not limited to any specific configuration of the load 140.

When the fuel cell devices 100A and 100B are used for vehicles, the load 140A may include a battery 142 and an inverter and a driving motor 144, as shown in FIG. 2. The inverter may be connected to the first voltage, may convert the supplied first voltage in the DC form into a voltage in the AC form according to the driving state of the vehicle including the fuel cell device 100A, and may output the converted voltage in the AC form to the driving motor of the vehicle. The driving motor may be driven in response to the AC voltage that is output from the inverter. That is, the driving motor may be rotated by receiving the AC voltage for a motor from the inverter, thereby serving to drive the vehicle. For example, the driving motor may be a three-phase AC rotating device including a rotor in which permanent magnets are embedded, but the embodiments are not limited to any specific type of inverter and driving motor 144.

The battery 142 may be connected to the second positive terminal P2 and the second negative terminal N2 so as to be charged with the first voltage. The inverter and the driving motor 144 may be connected to the second positive terminal P2 and the second negative terminal N2 so as to be driven.

In the fuel cell devices 100A and 100B shown in FIGS. 1 to 3, the bypass diode D may be detachably connected to the first positive terminal P1 and the second positive terminal P2 in the junction boxes 130A and 130B.

In the case in which the variation range of the stack voltage generated by and output from the fuel cell 110 at least partially overlaps the variation range of the battery voltage charged in the battery 142, the bypass diode D may be mounted in the junction box 130A or 130B in the form described above. However, in the case in which the variation range of the stack voltage generated by and output from the fuel cell 110 does not overlap the variation range of the battery voltage, the junction box 130A or 130B may not include the bypass diode D.

Hereinafter, the operation of the fuel cell devices 100A and 100B having the above-described configurations will be described with reference to FIG. 2. However, the operation to be described below may also be applied to the case in which each of the fuel cell devices 100A and 100B includes a load configured differently from the load 140A shown in FIG. 2.

The fuel cell device 100A according to the embodiment may operate in a bypass mode or in a normal mode.

The power controller 120 may operate only when the magnitude of the battery voltage is greater than the magnitude of the stack voltage of the fuel cell 110. However, when the magnitude of the battery voltage is less than the magnitude of the stack voltage, a bypass current having an uncontrollable magnitude may be generated. In this case, in order to protect the switching element S1 from the bypass current having a high magnitude, the power controller 120 operates in a bypass mode in which current flows in the direction of the arrow A1 shown in FIG. 2. The bypass mode continues until the magnitude of the battery voltage reaches a magnitude equal to the magnitude of the stack voltage.

When the magnitude of the battery voltage becomes equal to the magnitude of the stack voltage, the bypass current does not flow, and the fuel cell device 100A operates in the normal mode. When the magnitude of the battery voltage is equal to or greater than the magnitude of the stack voltage, the fuel cell device 100A operates in the normal mode. In this case, in the normal mode, the power controller 120 performs an operation of the boost converter, that is, a normal operation of boosting the stack voltage. In the normal mode, the current required for the voltage-boosting operation of the power controller 120 flows in the direction of the arrow A2 shown in FIG. 2, whereby the battery 142 is charged with the voltage, and the inverter and the driving motor 144 are driven.

Figure 4:
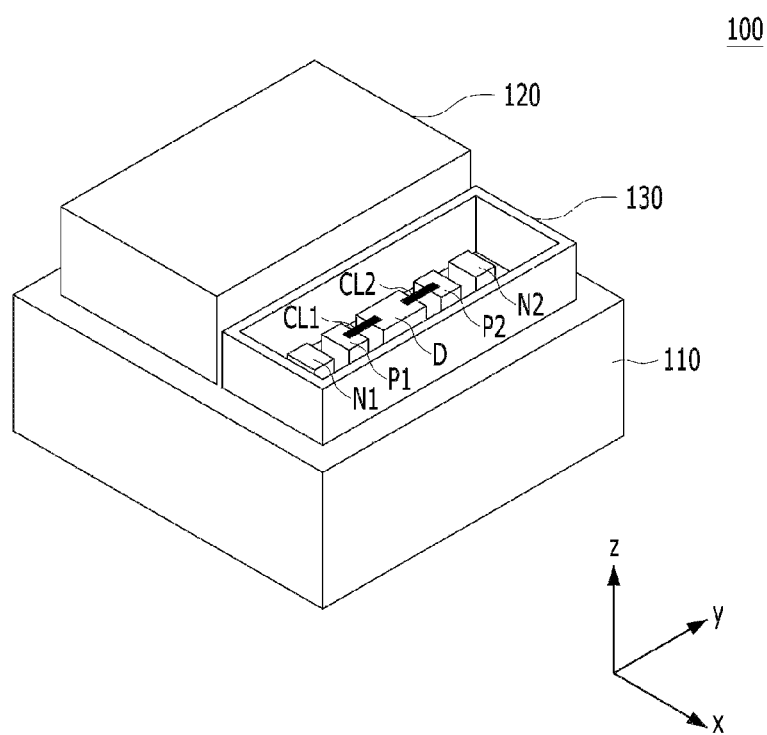
FIG. 4 is a perspective view showing the external appearance of the fuel cell device according to the embodiment.
Figure 5:
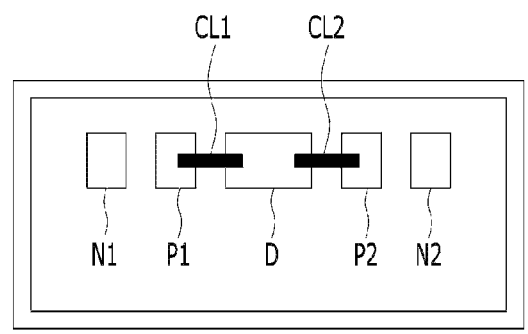
FIG. 5 is a plan view of the junction box shown in FIG. 4.
Figure 5:
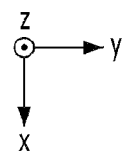

FIG. 4 is a perspective view showing the external appearance of the fuel cell device 100 according to the embodiment, and FIG. 5 is a plan view of the junction box 130 shown in FIG. 4.

Although it is illustrated in FIG. 4 that the power controller 120 and the junction box 130 are disposed on the fuel cell 110, the embodiments are not limited thereto. Alternatively, one of the power controller 120 and the junction box 130 may be disposed on the fuel cell 110, and the other one of the power controller 120 and the junction box 130 may be disposed beside the fuel cell 110.

Also, referring to FIG. 5, the junction box 130 may include first and second positive terminals P1 and P2, first and second negative terminals N1 and N2, a bypass diode D, and wires CL1 and CL2. Here, the first and second positive terminals P1 and P2, the first and second negative terminals N1 and N2, and the bypass diode D respectively correspond to, and perform the same functions as, the first and second positive terminals P1 and P2, the first and second negative terminals N1 and N2, and the bypass diode D shown in FIGS. 1 to 3 described above. Therefore, the same parts are denoted by the same reference numerals, and duplicate descriptions thereof will be omitted.

Referring to FIG. 5, the first wire CL1 electrically connects the anode of the bypass diode D and the first positive terminal P1 to each other, and the second wire CL2 electrically connects the cathode of the bypass diode D and the second positive terminal P2 to each other. In the case in which the bypass diode D is disposed as shown in FIG. 5, it may be possible to easily mount or separate the bypass diode D in or from the junction box 130.

Hereinafter, a fuel cell device according to a comparative example and the fuel cell device according to the embodiment will be described with reference to the accompanying drawings.

Figure 6:
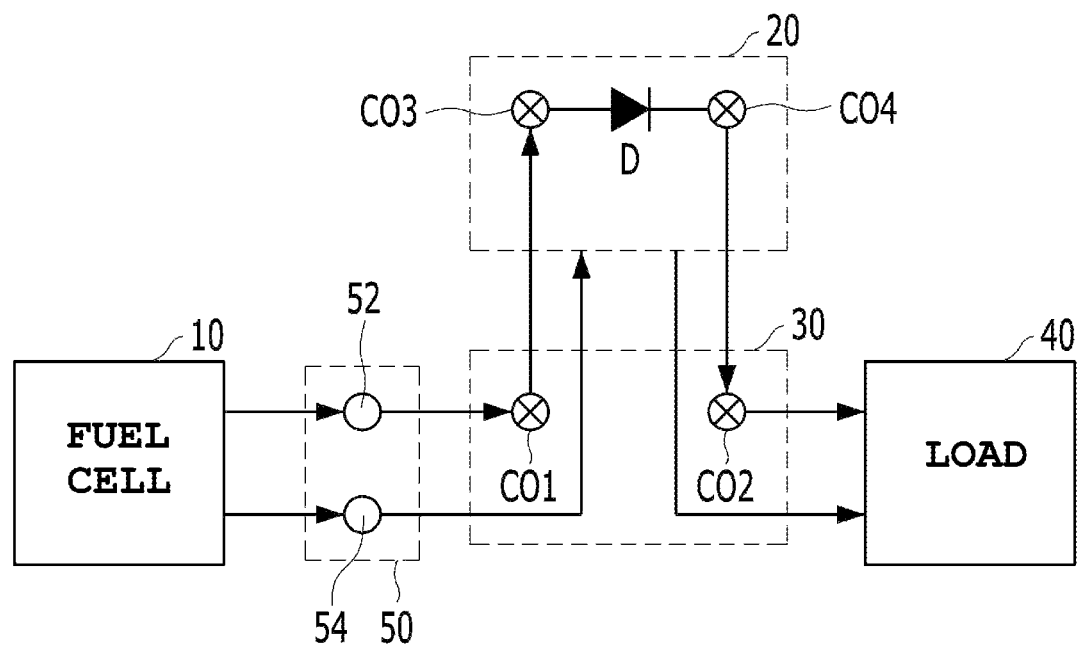
FIG. 6 is a block diagram of a fuel cell device according to a comparative example.

FIG. 6 is a block diagram of a fuel cell device according to a comparative example.

The fuel cell device according to the comparative example may include a fuel cell 10, a power controller 20, a junction box 30, and a load 40. Here, the fuel cell 10, the power controller 20, the junction box 30, and the load 40 respectively perform the same functions as the fuel cell 110, the power controller 120 (120A), the junction box 130 (130A or 130B), and the load 140 according to the embodiment, and thus a duplicate description thereof will be omitted.

In addition, the fuel cell device according to the comparative example may further include a terminal block 50. The terminal block 50 performs the same function as the terminal block 150 described above. Accordingly, a positive bus terminal portion 52 and a negative bus terminal portion 54 included in the terminal block 50 respectively correspond to the positive bus terminal portion 152 and the negative bus terminal portion 154 described above, and thus a duplicate description thereof will be omitted.

Although the power controller 20 is illustrated as including only a bypass diode D and third and fourth coupling parts CO3 and CO4, the power controller 20 may include the inductor L, the switching element S1, and the semiconductor switch S2 shown in FIG. 2, and may further include the first and second capacitors C1 and C2.

In the case of the fuel cell device according to the comparative example, the stack voltage generated in the fuel cell 10 is transmitted to the power controller 20 via the junction box 30. That is, unlike the embodiment, the stack voltage generated in the fuel cell 10 is not directly provided to the power controller 20. The bypass diode D is included in the power controller 20, rather than in the junction box 30.

When the magnitude of the voltage of the load 40 (e.g., the battery voltage) is less than the magnitude of the stack voltage, the bypass diode D is used in order to protect the switching element of the power controller 20 from the bypass current having a high magnitude. Since the output of the fuel cell 10 is high, for example, ranges from several tens of kW to several hundreds of kW, the magnitude of the current that is generated is also high, for example, several hundreds of amperes (A). Accordingly, the magnitude of the bypass current that flows through the bypass diode D may also be very high, for example, may range from several tens of amperes (A) to several hundreds of amperes (A). As such, since the magnitude of the bypass current is high, the bypass diode D is very likely to be damaged.

In the case of the comparative example, when the bypass diode D is damaged, it is not possible to open the power controller 20 in order to replace the bypass diode D. The reason for this is that the power controller 20 is not capable of being opened after being manufactured because a cover thereof is sealed in order to meet a predetermined environmental criterion (e.g., waterproofness). For this reason, even if only the bypass diode D is damaged, it is required to replace the entire power controller 20, which is expensive, thus leading to an increase in servicing costs.

In contrast, in the case of the embodiment, the bypass diode D is disposed in the junction box 130 (130A or 130B), rather than in the power controller 120. In general, the junction box 130 (130A or 130B) is capable of being opened for servicing, unlike the power controller 120 (120A). Accordingly, in the case of the embodiment, when the bypass diode D is damaged, it is possible to replace only the damaged bypass diode D by opening the junction box 130 (130A or 130B). As a result, servicing costs may be reduced compared to the comparative example.

Further, as described above, in the case of the comparative example, because the power controller 20 is not capable of being opened, it is required to separately manufacture a power controller 20 that includes a bypass diode D and a power controller 20 that does not include a bypass diode D. That is, it is required to manufacture two types of power controllers 20, which are expensive.

In contrast, in the case of the embodiment, the bypass diode D may be mounted in the junction box 130 (130A or 130B), or may be separated from the junction box 130 (130A or 130B). As such, since the bypass diode D is not included in the power controller 120 (120A), it is possible to manufacture the power controller 120 (120A) in one standardized form. In general, the power controller 120 (120A) is about ten times more expensive than the junction box 130 (130A or 130B). Accordingly, although the fuel cell device according to the embodiment has one type of power controller 120 (120A), which does not include the bypass diode D, the fuel cell device according to the embodiment is capable of being widely used in various fields (fields in which the bypass diode D has conventionally been necessary and fields in which the bypass diode D is not necessary).

In general, energy conduction loss occurs as current flows, which may be expressed using Equation 1 below.

$$I^2R \qquad \text{Equation 1}$$

Here, "I" represents current, and "R" represents resistance.

The resistance is influenced by the length of the path along which current flows, the cross-sectional area of the bus bar, and the number of coupling parts (e.g., CO1, CO2, CO3, and CO4) (i.e., contact resistance).

Considering this, the comparative example further includes the third and fourth coupling parts CO3 and CO4 as well as the first and second coupling parts CO1 and CO2 in order to mount the bypass diode D in the power controller 20. Further, in the case of the comparative example, because the stack voltage is transmitted to the power controller 20 via the junction box 30, the length of the current transfer path increases. As such, since the number of coupling parts in the comparative example is greater than that in the embodiment and the length of the current transfer path in the comparative example is longer than that in the embodiment, power transfer loss in the comparative example is greater than that in the embodiment. The reasons for this are that, unlike the comparative example, the embodiment does not require the third or fourth coupling part CO3 or CO4, thus reducing contact resistance, and the stack voltage is directly transmitted to the power controller 120 (120A), thus shortening the current transfer path. Although not shown, the junction box 30 according to the comparative example may include various switches, relay elements, fuses, and the like. However, the junction box 130 (130A or 130B) according to the embodiment does not include switches, relay elements, or fuses, and as described above, provides a space in which the fuel cell 110 and the power controller 120 (120A) are connected to each other. That is, the fuel cell 110 and the power controller 120 (120A) are directly connected to the connection terminals P1, N1, P2, and N2 of the junction box 130 (130A or 130B). Since the fuel cell 110 is directly connected to the power controller 120 (120A), the length of the current transfer path may be shorter than that in the comparative example. Therefore, compared to the comparative example, the embodiment exhibits reduced power transfer loss and reduced generation of heat, thereby improving energy transfer efficiency.

Further, the power controller 20 of the comparative example includes therein the first and second capacitors C1 and C2. Therefore, in the event of damage to the first and second capacitors C1 and C2, it is impossible to replace only the first and second capacitors C1 and C2, and thus it is required to replace the entire power controller 20, which is expensive. In contrast, in the case of the embodiment, as shown in FIG. 3, the first and second capacitors C1 and C2 may be disposed in the junction box 130B, rather than in the power controller 120 (120A). Accordingly, it is possible to replace the damaged first and second capacitors C1 and C2 without the need to replace the expensive power controller 120 (120A). As a result, servicing costs may be further reduced.

As is apparent from the above description, the fuel cell device according to the embodiments may further reduce servicing costs. In addition, since power transfer loss and generation of heat are reduced, energy transfer efficiency may be improved. In addition, although the fuel cell device according to the embodiments has a single type of power controller, the fuel cell device according to the embodiments is capable of being widely used in various fields.

However, the effects achievable through the disclosure are not limited to the above-mentioned effects, and other effects not mentioned herein will be clearly understood by those skilled in the art from the above description.

The above-described various embodiments may be combined with each other without departing from the scope of the present disclosure unless they are incompatible with each other.

In addition, for any element or process that is not described in detail in any of the various embodiments, reference may be made to the description of an element or a process having the same reference numeral in another embodiment, unless otherwise specified.

While the present disclosure has been particularly shown and described with reference to exemplary embodiments thereof, these embodiments are only proposed for illustrative purposes, and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A fuel cell device comprising:
   a fuel cell;
   a power controller configured to convert a magnitude of a stack voltage output from the fuel cell and to output the stack voltage having the converted magnitude to a load; and
   a junction box comprising a bypass diode that comprises an anode coupled to the stack voltage and to a voltage input terminal of the power controller and a cathode coupled to a voltage output terminal of the power controller and to the load, wherein the voltage output terminal of the power controller is configured to carry a voltage having the converted magnitude.

2. The fuel cell device according to claim 1, wherein the junction box comprises:
   a first positive terminal connected to a positive output terminal of the fuel cell and to a positive input terminal of the voltage input terminal;
   a first negative terminal connected to a negative output terminal of the fuel cell and to a negative input terminal of the voltage input terminal;
   a second positive terminal connected to a positive output terminal of the voltage output terminal and to the load; and
   a second negative terminal connected to a negative output terminal of the voltage output terminal and to the load.

3. The fuel cell device according to claim 2, wherein:
   the anode of the bypass diode is connected to the first positive terminal; and
   the cathode of the bypass diode is connected to the second positive terminal.

4. The fuel cell device according to claim 3, wherein the junction box comprises:
   a first coupling part coupled to the first positive terminal and to the anode of the bypass diode; and
   a second coupling part coupled to the second positive terminal and to the cathode of the bypass diode.

5. The fuel cell device according to claim 3, wherein the bypass diode is detachably connected to the first positive terminal and to the second positive terminal.

6. The fuel cell device according to claim 5, wherein the load comprises:
   a battery connected to the second positive terminal and to the second negative terminal; and
   an inverter and a driving motor connected to the second positive terminal and to the second negative terminal.

7. The fuel cell device according to claim 6, wherein a variation range of the stack voltage at least partially overlaps a variation range of a voltage charged in the battery.

8. The fuel cell device according to claim 1, wherein the bypass diode is disposed to allow the bypass diode to be replaced from the junction box.

9. The fuel cell device according to claim 1, wherein the stack voltage is configured to be directly transmitted to the power controller.

10. The fuel cell device according to claim 1, wherein the fuel cell and the power controller are directly connected to the junction box.

11. A fuel cell device comprising:
    a fuel cell;
    a power controller configured to convert a magnitude of a stack voltage output from the fuel cell and to output the stack voltage having the converted magnitude to a load; and
    a junction box comprising:
      a bypass diode comprising an anode connected to the stack voltage and to a voltage input terminal of the power controller and a cathode connected to a voltage output terminal of the power controller and to the load, wherein the voltage output terminal of the power controller is configured to output a voltage having the converted magnitude;
      a first positive terminal connected to a positive output terminal of the fuel cell and to a positive input terminal of the voltage input terminal;
      a first negative terminal connected to a negative output terminal of the fuel cell and to a negative input terminal of the voltage input terminal;
      a second positive terminal connected to a positive output terminal of the voltage output terminal and to the load; and
      a second negative terminal connected to a negative output terminal of the voltage output terminal and to the load; and
    wherein the power controller comprises:
      an inductor having a first end connected to the first positive terminal;
      a switching element having a first end connected to a second end of the inductor and a second end connected to the second positive terminal; and
      a semiconductor switch having a first end connected to the second end of the inductor and a second end connected to the first negative terminal and to the second negative terminal.

12. The fuel cell device according to claim 11, wherein the power controller further comprises:
    a first capacitor disposed between the first end of the inductor and the second end of the semiconductor switch; and
    a second capacitor disposed between the second end of the switching element and the second end of the semiconductor switch.

13. The fuel cell device according to claim 11, wherein the junction box further comprises:
    a first capacitor disposed between the first positive terminal and the first negative terminal; and
    a second capacitor disposed between the second positive terminal and the second negative terminal.

14. The fuel cell device according to claim 13, wherein the first capacitor and the second capacitor are disposed to allow the first capacitor and the second capacitor to be replaced from the junction box.

15. A fuel cell device comprising:
    a fuel cell;
    a load;

a power controller configured to convert a magnitude of a stack voltage output directly from the fuel cell to the power controller and to output the stack voltage having the converted magnitude to the load; and a junction box directly connected to the fuel cell and to the power controller, the junction box comprising a bypass diode, the bypass diode comprising:

an anode coupled to the stack voltage and to a voltage input terminal of the power controller; and a cathode coupled to a voltage output terminal of the power controller and to the load, wherein the voltage output terminal of the power controller is configured to carry a voltage having the converted magnitude.

16. The fuel cell device according to claim 15, wherein the junction box comprises:

a first positive terminal connected to a positive output terminal of the fuel cell and to a positive input terminal of the voltage input terminal;

a first negative terminal connected to a negative output terminal of the fuel cell and to a negative input terminal of the voltage input terminal;

a second positive terminal connected to a positive output terminal of the voltage output terminal and to the load; and a second negative terminal connected to a negative output terminal of the voltage output terminal and to the load.

17. The fuel cell device according to claim 16, wherein:

the anode of the bypass diode is connected to the first positive terminal; and the cathode of the bypass diode is connected to the second positive terminal.

18. The fuel cell device according to claim 17, wherein the junction box comprises:

a first coupling part coupled to the first positive terminal and to the anode of the bypass diode; and a second coupling part coupled to the second positive terminal and to the cathode of the bypass diode.

19. The fuel cell device according to claim 17, wherein the bypass diode is detachably connected to the first positive terminal and to the second positive terminal.

20. The fuel cell device according to claim 19, wherein the load comprises:

a battery connected to the second positive terminal and to the second negative terminal; and an inverter and a driving motor connected to the second positive terminal and to the second negative terminal.

* * * * *